(12) United States Patent
Rhodes et al.

(10) Patent No.: US 7,381,252 B2
(45) Date of Patent: Jun. 3, 2008

(54) ANTI-CORROSION ADDITIVE COMPOSITION FOR CONCRETE COMPOSITIONS FOR USE IN REINFORCED CONCRETE STRUCTURES

(75) Inventors: Philip S. Rhodes, Teaneck, NJ (US); Jason S. Tuerack, Jericho, NY (US); Leonid Izrailev, Brooklyn, NY (US); David G. Rosenberg, Jersey City, NJ (US)

(73) Assignee: Hycrete, Inc., Carlstadt, NJ (US)

( * ) Notice: Subject to any disclaimer, the term of this patent is extended or adjusted under 35 U.S.C. 154(b) by 0 days.

(21) Appl. No.: 10/702,012

(22) Filed: Nov. 6, 2003

(65) Prior Publication Data

US 2004/0237835 A1 Dec. 2, 2004

Related U.S. Application Data

(63) Continuation-in-part of application No. 10/447,975, filed on May 29, 2003, now abandoned.

(51) Int. Cl.
*C04B 24/04* (2006.01)
*C04B 103/61* (2006.01)
*C23F 11/00* (2006.01)

(52) U.S. Cl. .............. 106/14.41; 106/14.13; 106/14.44; 106/728; 106/810; 252/389.1; 252/389.2; 252/389.24; 252/389.31; 252/396

(58) Field of Classification Search .......... 106/14.13, 106/810, 14.44, 728, 14.41; 252/389.62, 252/389.1, 389.2, 389.24, 329.31, 396
See application file for complete search history.

(56) References Cited

U.S. PATENT DOCUMENTS 3,682,718 A 8/1972 Palm et al.
3,763,083 A 10/1973 Grotheer
4,869,752 A * 9/1989 Jaklin .................. 106/14.21
6,071,436 A * 6/2000 Incorvia .................. 252/392
6,277,450 B1 * 8/2001 Katoot et al. ............ 427/512

FOREIGN PATENT DOCUMENTS

| JP | 4-255709 | 9/1992 |
| JP | 6-115992 | 4/1994 |
| WO | 85/05066 | 11/1985 |
| WO | 97/20900 | 6/1997 |
| WO | 98/01509 | 1/1998 |
| WO | 02/43881 | 6/2002 |

OTHER PUBLICATIONS

Allyn Jr. et al, "Strength and durability of concrete containing salts of alkenyl-succinic acid", ACI Materials Journal, 98(1), pp. 52-58 (Jan.-Feb. 2001).*
Allyn Jr. et al, "Corrosion Tests with concrete containing salts of alkenyl-substituted succinic acid", ACI Materials Journal, 98(3), pp. 224-232 (May-Jun. 2001).*
Goodwin, et al., Protection of Reinforcement With Corrosion Inhibitors, Phase II, Dec. 2002, 125 pages.
Civjan, et al., Performance Evaluation and Economic Analysis of Combinations of Durability Enhancing Admixtures (Mineral and Chemical) in Structural Concrete for The Northeast U.S.A., Feb. 2003, 165 pages.

* cited by examiner

*Primary Examiner*—Anthony J. Green
(74) *Attorney, Agent, or Firm*—McCarter & English, LLP

(57) ABSTRACT

An anti-corrosive additive composition is provided that includes an alkali-based salt of dioic acid and a defoamer agent. The defoamer agent is generally selected from the group consisting of a polyether modified polysilicane, a tri-alkane phosphate, a tri-alkene phosphate, and mixtures thereof. The anti-corrosive additive is particularly adapted for use with concrete compositions, e.g., a concrete composition that includes at least one rebar.

5 Claims, No Drawings

ANTI-CORROSION ADDITIVE COMPOSITION FOR CONCRETE COMPOSITIONS FOR USE IN REINFORCED CONCRETE STRUCTURES

RELATED APPLICATIONS

This application is a continuation-in-part of U.S. application Ser. No. 10/447,975 filed May 29, 2003 and now abandoned which is, hereby incorporated by reference.

BACKGROUND OF THE INVENTION

1. Field of the Invention

This invention relates to an anti-corrosive additive composition for concrete compositions, and more particularly to an anti-corrosive additive composition for concrete compositions used in reinforced concrete structures.

2. Description of the Prior Art

For structures made of reinforced concrete, concrete has at least two functions, i.e. to absorb compressive strains and to protect reinforcing steel bars or re-bars against corrosion. The re-bars function to absorb shear and tensile stress.

The cost of corrosion is annually estimated to be in the billions with concomitant catastrophic collapses of structures and losses in lives. The protective effect of hardened concrete on re-bars depends, inter alia, on climatic and environmental conditions as a function of amount of cement, grain of concrete aggregate, water/cement factor and concrete compression.

In U.S. Pat. No. 4,869,752 to Jaklin, there is described the use of modified inorganic silicates, e.g. modified alkali silicates as a concrete additive to prevent corrosion of steel structures or steel re-bars.

In U.S. Pat. No. 6,277,450 to Katoot, there is described the use of a coating process to coat the surface of the metals which is modified to an active moiety of metal hydroxide receptive to a fully cross-lined polymer of various thickness.

In copending application U.S. Ser. No. 10/447,975, there is disclosed an anticorrosive additive comprised of an alkali based solution of dioic acid, alone or in admixture with other compositions for an anti-corrosion additive for concrete compositions providing for more effective corrosion protection for longer periods of time obviating costly precoating of surfaces of metals used in the building and construction industry.

However, there is a need for inclusion of a composition in the anticorrosive additive to reduce excessive air entrainment or foaming during preparation of concrete mixes and for controlled air content of the cured concrete. To improve freeze/thaw properties, it is most effective to control air entrainment within cured concrete to about 5 to 8% with evenly spaced apart bubbles having a specific surface of from 600 to 1,100 square inches per cubic inch spaced apart by 0.004 to 0.008 inches.

OBJECTS OF THE INVENTION

An object of the present invention is to provide an improved anti-corrosive additive composition including a more effective agent to reduce air entrainment during preparation of concrete mixes.

Another object of the present invention is to provide for an improved anticorrosive additive composition to be admixed with concrete prior to pouring which reduces water permeability and concomitant corrosion of reinforcing steel members.

A further object of the present invention is to provide for an improved anti-corrosive additive composition for concrete substrates for controlled air content of cured concrete.

SUMMARY OF THE INVENTION

These and other objects of the present invention are achieved by an anti-corrosive additive composition comprised of an alkali based salt of dioic acid and a defoaming agent selected from the group consisting of polyether modified polysilicones and tri-alkane/alkene phosphates and mixtures thereof.

DETAILED DESCRIPTION OF THE INVENTION

The anti-corrosive additive composition of the present invention is comprised of an alkali based salt of dioic acid and the defoaming agent is selected from the group consisting of polyether modified polysilicone and tri-alkane/alkene phosphates and mixtures thereof.

The alkali-based salt of dioic acid is represented by the following formula:

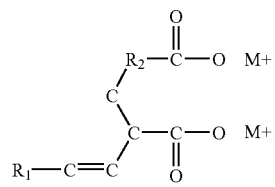

wherein M+ is selected from the group consisting of Na+ and K+; $R_1$ is a $C_1$ to $C_{24}$ branch linear aliphatic hydrocarbon and $R_2$ is a $C_1$-$C_{10}$ branch or linear aliphatic hydrocarbon.

The defoaming agent is selected from the group consisting of polyether modified polysilicanes and tri-alkane/alkene phosphates and mixtures thereof. Polyether modified silicanes are sold by BYK Chemie (Germany) under the trademarks BYK025 and BYK094.

The tri-alkane/alkene phosphates are illustrated by the formula:

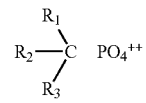

where $R_1$, $R_2$ and $R_3$ are $C_1$ to $C_8$ alkane or alkene hydrocarbons. Such a tri-alkane having the formula of $(C_4H_9)_3 PO_4$ is available from Alszo Nobel of Germany under the Trade name Phosflex 4.

The polyether modified polysilicanes are admixed in an amount from 0.1 to 2.0% by weight, preferably about 1% by weight to the alkali-based salt of dioic acid. The tri-alkane/alkene phosphates are admixed in an amount from 1.0 to 8.0% by weight, preferably 5.0% by weight to the alkali based salt of dioic acid. The defoamer may be tri-alkane/alkene phosphate present in an amount of from 1.0 to 2.0% by weight of the alkali based salt of dioic acid.

A method of preparing the alkali-based salt of dioic acid is disclosed in the aforementioned copending parent application.

The anti-corrosive additive composition of the present invention is admixed with a concrete composition in an amount of from 2 to about 5 pounds per cubic yard of concrete. Additionally, stabilizing agents such as benzoic acid, maleic acid and the like may also be admixed into the anti-corrosive additive composition of the present invention.

The following Examples are illustrative of the present invention.

EXAMPLE 1

A concrete mixture of the following components

| A | # |
|---|---|
| Course Aggregates | 1750 |
| Fine Aggregates | 1285 |
| Portland Cement | 611 |
| Water Reducer | 1125 | is admixed with 272 lbs of water. The resulting cured concrete has an air content of about 2%. Results of such concrete mixture when admixed with 5.2 lbs of an alkenyl succinic acid metal salts ("ASA") together with and without various amounts (in lbs) of defoamer as illustrated below in Table I.

TABLE I

| CONCRETE | A | A | A | A | A | A | A | A | A | A | A | A | A |
|---|---|---|---|---|---|---|---|---|---|---|---|---|---|
| Hycrete ASA Without Water | 3.2 | 3.2 | 3.2 | 3.2 | 3.2 | 3.2 | 3.2 | 3.2 | 3.2 | 3.2 | 3.2 | 3.2 | 3.2 |
| BYK025 | .016 | .032 | | | | .016 | .016 | | | | .008 | .016 | |
| BYK094 | | | .016 | .032 | | | | | .016 | .016 | .008 | .016 | |
| Phosphlex 4 | | | | | .170 | .340 | .17 | .34 | .17 | .34 | .17 | .34 | |
| Percent Air | 9 | 8 | 8 | 8 | 9 | 7 | 8 | 5 | 8 | 4 | 6 | 3.5 | 11 |

EXAMPLE 2

A concrete mixture of the following components:

| B | # |
|---|---|
| Course Aggregates | 1825 |
| Fine Aggregates | 1284 |
| Portland Cement | 436 |
| Slag Cement | 197 |
| Silica Fumes | 25 |
| Water Reducer | 1.125 |
| High Range Water Reducer | 3.375 | is admixed with 175 lbs of water. The resulting cured concrete has an air content of about 2.3%. Results of such concrete mixture when admixed with 3.2 of ASA together with various amounts of a defoamer is illustrated below in Table II.

TABLE II

| CONCRETE | B | B | B | B | B | B | B | B | B | B | B | B | B |
|---|---|---|---|---|---|---|---|---|---|---|---|---|---|
| Hycrete ASA Without Water | 3.2 | 3.2 | 3.2 | 3.2 | 3.2 | 3.2 | 3.2 | 3.2 | 3.2 | 3.2 | 3.2 | 3.2 | 3.2 |
| BYK025 | .016 | .032 | | | | .016 | .016 | | | | .008 | .016 | |
| BYK094 | | | .016 | .032 | | | | | .016 | .016 | .008 | .016 | |
| Phosphlex 4 | | | | | .170 | .340 | .17 | .34 | .17 | .34 | .17 | .34 | |
| Percent Air | 8 | 7 | 7.5 | 7 | 8 | 7 | 7 | 4.5 | 7.5 | 3.5 | 5 | 2.5 | 10 |

The foregoing examples are illustrative of the effectiveness of the anticorrosive additive composition of the present invention to control air entrainment between about 2 to 8% where a defoamer is present in an amount as above hereinabove set forth.

While the present invention has been described with respect to the exemplary embodiments thereof it will be recognized by those of ordinary skill in the art that many modifications or changes can be achieved without departing from the spirit and scope of the invention. Therefore it is manifestly intended that the invention be limited only by the scope of the claims and the equivalence thereof.

What is claimed is:

1. An anti-corrosive additive composition for admixture with a concrete composition, said anti-corrosive additive composition comprising:

(i) an akali-based salt of dioic acid of the formula:

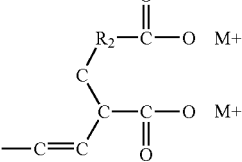

wherein M+ is selected from the group consisting of Na+ and K+; $R_1$ is a $C_1$ to $C_{24}$ branch or linear aliphatic compound and $R_2$ is a $C_0$ to $C_{10}$ branch or linear aliphatic compound; and (ii) polyether modified polysilicane as a defoamer agent in an amount of from 0.1 to 2.0% by weight of said alkali based salt of dioic acid.

2. The anticorrosive additive composition as defined in claim 1, wherein said polyether modified polysilicane is present in an amount of about 0.1% by weight of said alkali based salt of dioic acid.

3. An anti-corrosive additive composition for admixture with a concrete composition, said anti-corrosive additive composition comprising:

(i) an alkali-based salt of dioic acid of the formula:

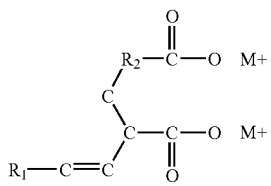

wherein M+ is selected from the group consisting of Na+ and K+; $R_1$ is a $C_1$ to $C_{24}$ branch or linear aliphatic compound and $R_2$ is a $C_0$ to $C_{10}$ branch or linear aliphatic compound; and (ii) tri-alkane/alkene phosphate as a defoamer agent in an amount of from 1.0 to 2.0% by weight of said alkali based salt of dioic acid.

4. The anticorrosive additive composition in accordance with claim 3, wherein said defoamer agent is tri-alkane/alkene phosphate and is present in an amount of from 1.0 to 2.0% by weight of said alkali based salt of dioic acid.

5. The anticorrosive additive composition in accordance with claim 3, wherein said tri-alkane/alkene phosphate is present in an amount of about 5.0% by weight of said alkali based salt of dioic acid.

* * * * *